(12) United States Patent
Chen et al.

(10) Patent No.: US 8,576,905 B2
(45) Date of Patent: Nov. 5, 2013

(54) CENTRAL DECODING CONTROLLER AND CONTROLLING METHOD THEREOF

(75) Inventors: Jiann-jone Chen, Taipei (TW); Jyun-jie Jhuang, Taipei (TW); Shih-chieh Lee, Taipei (TW); Chen-hsiang Sun, Taipei (TW); Ching-hua Chen, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 620 days.

(21) Appl. No.: 12/838,412

(22) Filed: Jul. 16, 2010

(65) Prior Publication Data

US 2011/0182359 A1 Jul. 28, 2011

(30) Foreign Application Priority Data

Jan. 22, 2010 (TW) ................................. 099101789

(51) Int. Cl.
*H04B 1/66* (2006.01)
*H04N 7/12* (2006.01)
*H04N 11/02* (2006.01)
*H04N 11/04* (2006.01)

(52) U.S. Cl.
USPC .................. 375/240; 375/240.12; 375/240.13; 375/240.15

(58) Field of Classification Search
None
See application file for complete search history.

(56) References Cited

U.S. PATENT DOCUMENTS

2006/0002469 A1* 1/2006 Zurov et al. ............. 375/240.12

OTHER PUBLICATIONS

Olivier Crave et al., "Distributed Temporal Multiple Description Coding for Robus Video Transmission," 2008, EURASIP Journal on Wireless Communcations and Networking—Multimedia over Wireless Networks, Article No. 12.*
Yang et al., "Adaptive Key Frame Selection Wyner-Ziv Video Coding," Oct.-Nov. 2005, Multimedia Signal Processing, 2005 IEEE 7th Workshop.*
Lee et al., "The Improved Central Decoder of a Multiple Description and Distributed Codec for Videos," Jul. 2010, Multimedia and Expo (ICME), 2010 IEEE International Conference, pp. 261-266.*
An Improved Central Decoder for Multiple Description Coder Integrated with Distributed Video Coder.

* cited by examiner

*Primary Examiner* — Joseph Ustaris
*Assistant Examiner* — Edemio Navas, Jr.

(57) ABSTRACT

A central decoding controller and a central decoder controlling method are disclosed. A video stream is processed and transmitted via at least two parallel channels. The method comprises steps of: receiving a video key frame obtained by decoding an original video frame via a first channel, and a plurality of intra-description frames neighboring the video key frame; receiving a predictive video frame obtained by processing a prediction analysis and an error correction to the original video frame via a second channel parallel to the first channel; receiving a plurality of inter-description frames via the second channel, the inter-description frames neighboring the video key frame; calculating correlation of the video key frame, the intra-description frames, and the inter-description frames; and selecting the video key frame or the predictive video frame as an output frame according to the correlation result. The method can improve video quality under wireless transmission or unstable internet transmission.

16 Claims, 8 Drawing Sheets

US 8,576,905 B2

CENTRAL DECODING CONTROLLER AND CONTROLLING METHOD THEREOF

This invention is partly disclosed in an published dissertation of National Taiwan University of Science and Technology, entitled "AN IMPROVED CENTRAL DECODER FOR MULTIPLE DESCRIPTION CODER INTEGRATED WITH DISTRIBUTED VIDEO CODER," completed by Jyun-Jie Jhuang, and published on Jul. 24, 2009.

CLAIM OF PRIORITY

This application claims priority to Taiwanese Patent Application Publication No. 099101789 filed on Jan. 22, 2010.

TECHNICAL FIELD OF THE INVENTION

The present invention relates to a central decoding controller and a controlling method thereof, and more particularly, to a central decoding controller and a controlling method adopting correlation operations.

BACKGROUND OF THE INVENTION

Multiple Description Coding (MDC) is an effective solution of multi-media transmission in the jammed internet and unstable wireless networks. The MDC promises the stability and reliability of multi-media communications with multiple transmission paths. Distributed Video Coding (DVC) redistributes the coding complexity from an encoder to a decoder for the sake of providing video communications for mobile devices (e.g. cell phones, PDAs).

SUMMARY OF THE INVENTION

An objective of the present invention is to provide a central decoding controller and controlling method thereof, for dynamically selecting a video frame of higher quality as an output frame.

Another objective of the present invention is to provide a central decoding controller and controlling method thereof, for improving video quality under wireless transmission or unstable internet transmission.

According to the above objectives, the present invention provides a central decoder controlling method, in which a video stream is processed and transmitted via at least two parallel channels, the method comprises steps of: receiving a video key frame obtained by decoding an original video frame via a first channel, and a plurality of intra-description frames neighboring the video key frame; receiving a predictive video frame obtained by processing a prediction analysis and an error correction to the original video frame via a second channel parallel to the first channel; receiving a plurality of inter-description frames via the second channel, the inter-description frames neighboring the video key frame; calculating correlation of the video key frame, the intra-description frames, and the inter-description frames; and selecting the video key frame or the predictive video frame as an output frame according to the correlation result.

The present invention further provides a central decoding controller, in which a video stream is processed and transmitted via at least two parallel channels, the central decoding controller comprises: a first terminal for receiving a video key frame obtained by decoding an original video frame via a first channel, and a plurality of intra-description frames neighboring the video key frame; a second terminal for receiving a predictive video frame obtained by processing an a prediction analysis and an error correction to the original video frame via a second channel parallel to the first channel, and a plurality of inter-description frames via the second channel, the inter-description frames neighboring the video key frame; a correlator, coupled to the first terminal and the second terminal, for calculating correlation of the video key frame, the intra-description frames, and the inter-description frames; an estimating logic and controller, coupled to the correlator, for controlling the correlator and outputting a signal according to the correlation result; and a multiplexer, receiving the video key frame from the first terminal and the predictive video frame from the second terminal, the multiplexer being coupled to the estimating logic and controller, in which the estimating logic and controller controls the multiplexer to select the video key frame or the predictive video frame as an output frame.

In the present invention, the two video codec approaches, MDC (multiple description codec) and DVC (distributed video codec), abbreviated as MDVC, can be effectively integrated to provide stable transmission and high efficient video coding. The MDVC would yield two separate video descriptions, and each comprises one key frame bit-stream and one Wyner-Ziv (WZ) frame bit-stream.

In the present invention, a predictive coding is adopted in the MDVC. The predictive coding can reduce the signal entropy in an encoding side and thus improve video quality in a decoding side.

In the present invention, the error correlation among intra-descriptions and inter-descriptions are utilized in the central decoding controller of the MDVC to dynamically select the best reconstructed frames from the two descriptions, instead of selecting only one description or selecting only key frames from the two descriptions, to yield the reconstructed video.

BRIEF DESCRIPTION OF THE DRAWINGS

The present invention will be described in details in conjunction with the appending drawings.

DETAILED DESCRIPTION OF THE INVENTION

Figure 1:
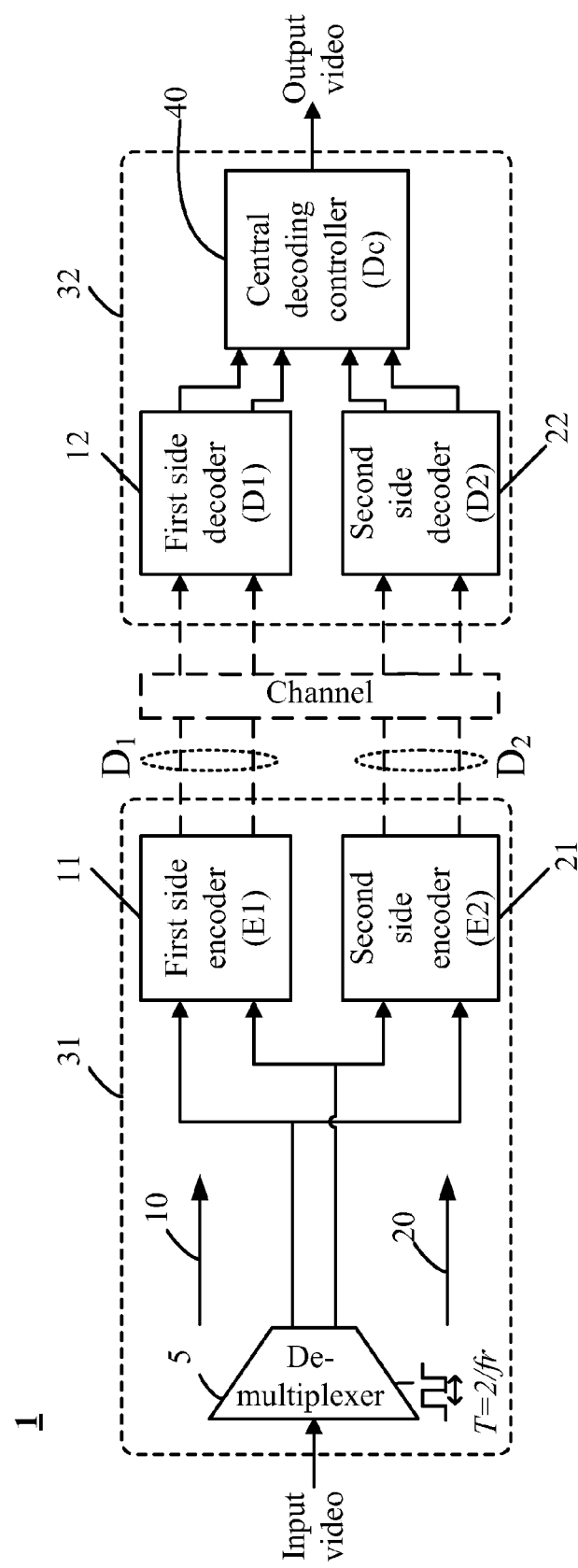
FIG. 1 is a structure diagram showing a video delivery system implemented according to the present invention.

Referring to FIG. 1, it is a structure diagram showing a video delivery system 1 implemented according to the present invention. The video delivery system 1 is a system combining a multiple description codec (MDC) with a distributed video codec (DVC), abbreviated as MDVC, which is capable of providing reliable and stable video transmission under wireless networks or jammed, unstable internet transmission.

As shown in FIG. 1, the video delivery system 1 includes an encoder 31 and a decoder 32. The encoder 31 has a de-multiplexer 5, a first side encoder (E1) 11, and a second side encoder (E2) 21. The decoder 32 has a first side decoder (D1) 12, a second side decoder (D2) 22, and a central decoding controller (Dc) 40.

An original video input is separated into video streams by the de-multiplexer 5 in the beginning, and then the video streams are transmitted and proceeded via a plurality of channels such as a first channel 10 and a second channel 20 in the video delivery system 1. One video stream is encoded by the first side encoder (E1) 11 and decoded by the first side decoder (D1) 12 via the first channel 10. The other video stream is encoded by the second side encoder (E2) 21 and decoded by the second side decoder (D2) 22 via the second channel 20. The two decoded video streams are transmitted to the central decoding controller (Dc) 40. The central decoding controller will select to output the video frames which are better in quality.

Figure 2:
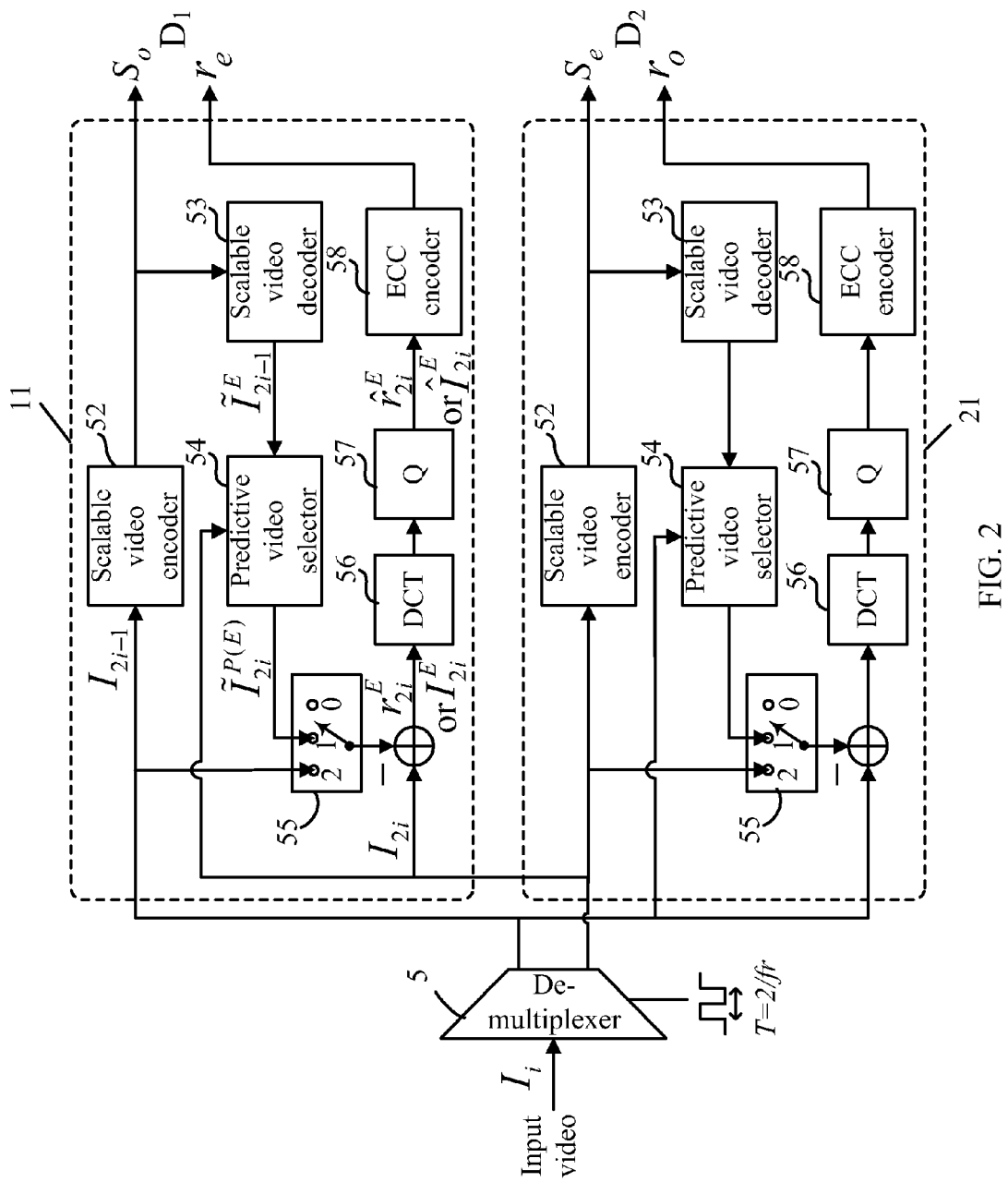
FIG. 2 is a structure diagram showing an encoder of the video delivery system shown in FIG. 1.

Referring to FIG. 2, it is a structure diagram showing the encoder 31 of the video delivery system 1 shown in FIG. 1. In the encoder 31, each side encoder (E1, E2) 11, 21 comprises a scalable video encoder 52, and an ECC (error correcting codes) encoder 58. The scalable video encoder 52 can be implemented as an MC-EZBC encoder. The ECC encoder 58 can be implemented as a Wyner-Ziv encoder. In addition, each side encoder (E1, E2) 11, 21 has an encoding mode selector 55. The video delivery system 1 can be operated in three modes, i.e. mode 0, mode 1, and mode 2. The mode 0 denotes pulse-code modulation (PCM) and is abbreviated as MDVC-DCT. The mode 1 denotes that differential pulse-code modulation (DPCM) is used, and is abbreviated as MDVC-RDCT1. In addition, the mode 2 denotes simplified DPCM and is abbreviated as MDVC-RDCT2. In the video delivery system 1, similar or the same operations are proceeded in the first side encoder (E1) 11 and the second side encoder (E2) 21 for respectively outputting information D1 and D2. Therefore, the detailed description about the second side encoder (E2) 21 is omitted herein.

In the encoder 11, the original video input is separated into video frames of odd and even subsequences, i.e. $I_{2i}$ and $I_{2i+1}$, by the de-multiplexer 5. The odd subsequences and the even subsequences are transmitted respectively via the scalable video encoders 52 of the first side encoder (E1) 11 and the second side encoder (E2) 21 for providing key frames, denoted as So and Se respectively. On the other hand, the even subsequence ($I_{2i}$) is also transmitted to the first side encoder (E1) 11. The even subsequence ($I_{2i}$) and a predictive image ($\tilde{I}_{2i}^{P(E)}$) are utilized to yield a residual signal ($r_{2i}^{E}$), and the residual signal ($r_{2i}^{E}$) is utilized for encoding into a WZ frame ($r_e$). Similarly, the odd subsequence ($I_{2i-1}$) is also transmitted to the second side encoder (E2) 21 for obtaining a WZ frame ($r_o$). The residual signal ($r_{2i}^{E}$) is a prediction error to the $I_{2i}$ image, and is substantially equal to the difference between the $I_{2i}$ image and the predictive image ($\tilde{I}_{2i}^{P(E)}$). The predictive image ($\tilde{I}_{2i}^{P(E)}$) is predicted from a reconstructed image ($\tilde{I}_{2i-1}^{E}$) which is decoded from a scalable video decoder 53, and the predictive image ($\tilde{I}_{2i}^{P(E)}$) is selected from a predictive image selector 54. During processing the residual signal ($r_{2i}^{E}$) in the Wyner-Ziv encoder, a transformer 56 operates discrete cosine transform (DCT) to generate coefficient bands, a quantizer 57 performs quantization operation to the coefficient bands, and an ECC encoder 58 executes error correction so as to generate the WZ frame ($r_e$). By the above-mentioned operations, the D1 information generated from the first side encoder (E1) 11 on the first channel 10 includes key frames (So) and their residual information, i.e. the WZ frames ($r_e$), and the D2 information generated from the second side encoder (E2) 21 on the second channel 20 includes key frames (Se) and their residual information, i.e. the WZ frames ($r_o$).

Figure 3:
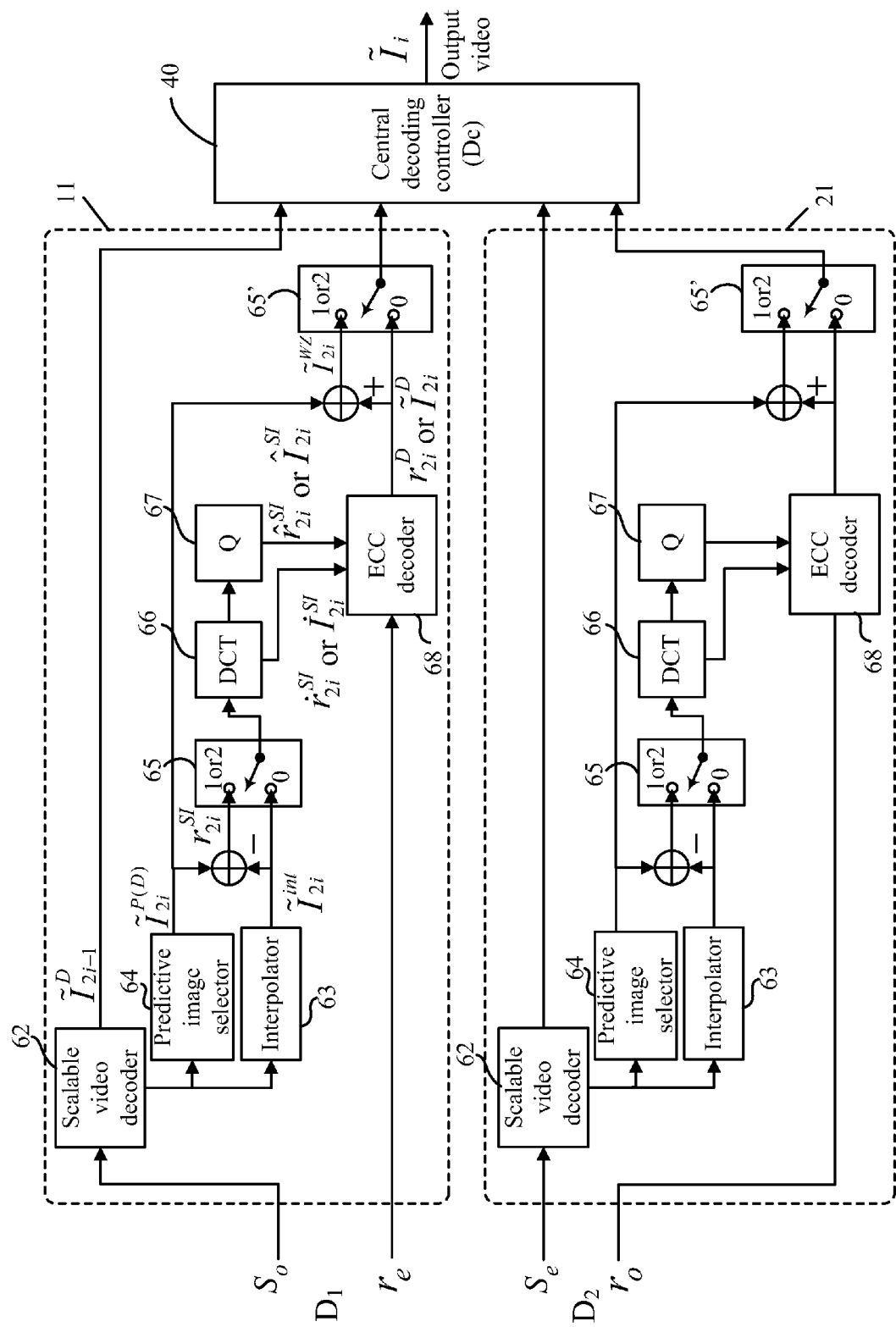
FIG. 3 is a structure diagram showing a decoder of the video delivery system shown in FIG. 1.

Referring to FIG. 3, it is a structure diagram showing the decoder 32 of the video delivery system 1 shown in FIG. 1. The decoder 32 includes the first side decoder (D1) 12, the second side decoder (D2) 22, and the central decoding controller (Dc) 40. In the decoder 32, each side decoder (D1, D2) 12, 22 comprises a scalable video decoder 62, and an ECC (error correcting codes) decoder 68. The scalable video decoder 62 can be implemented as MC-EZBC decoder. The ECC decoder 68 can be implemented as Wyner-Ziv decoder. The D1 information is inputted to the first side decoder (D1) 12. The key frames (So) are decoded and reconstructed into an image ($\tilde{I}_{2i-1}^{D}$), and then outputted to the central decoding controller (Dc) 40. The key frames (So) are also utilized to provide side information (SI) for the ECC decoder 68. The key frames (So) and their residual information, i.e. the WZ frames ($r_e$), are utilized to be reconstructed into video frames of even sequence ($\tilde{I}_{2i}^{WZ}$) by the ECC decoder 68. The second side decoder (D2) 22 performs similar operations to process the D2 information. The detailed description to this part is omitted herein. The reconstructed even sequence ($\tilde{I}_{2i}^{WZ}$) and odd sequence ($\tilde{I}_{2i-1}^{D}$) generated by the first side decoder (D1) 12 on the first channel 10 and the reconstructed odd sequence ($\tilde{I}_{2i-1}^{WZ}$) and even sequence ($\tilde{I}_{2i}^{D}$) generated by the second side decoder (D2) 22 on the second channel 20 are transmitted to the central decoding controller (Dc) 40 to be selected to output.

When the reconstructed frames are not much different to the original video frames, i.e. $\tilde{I}_{2i}^{D}$ substantially equal to $I_{2i}$, $\tilde{I}_{2i-1}^{D}$ substantially equal to $I_{2i-1}$, the WZ frames will be abandoned. This is because the central decoding controller (Dc) 40 only needs to select $\tilde{I}_{2i}^{D}$ or $\tilde{I}_{2i-1}^{D}$ to yield the best image quality. However, when only one description (such as information D1) is received, the central decoding controller (Dc) 40 still can maintain the video stream stable by using the frames $\tilde{I}_{2i}^{WZ}$ although the image quality is not great as desired.

Decoding mode selectors 65, 65' respectively in side decoders (D1, D2) 12, 22 have similar function as the encoding mode selectors 55 of each side encoder (E1, E2) 11, 21. The decoding mode selectors 65, 65' are operated in three modes, i.e. mode 0, mode 1, and mode 2, for modulating or decoding video signals. In addition, interpolators 63 are utilized for interpolation operations. The functions of predictive image selectors 64, transformers 66, and quantizers 67 in each side decoder (D1, D2) 12, 22 are similar or the same as the predictive image selectors 54, transformers 56, and quantizers 57 of each side encoder (E1, E2) 11, 21, respectively. The description is omitted herein.

Figure 4:
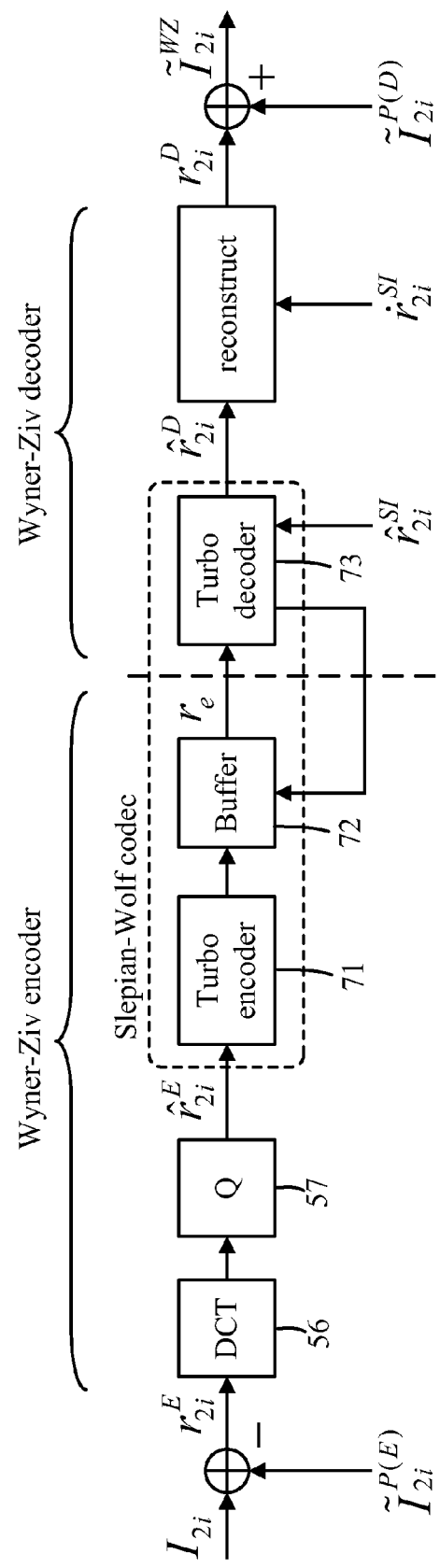
FIG. 4 is an exemplary diagram showing Wyner-Ziv codec.

Referring to FIG. 4, it is an exemplary diagram showing Wyner-Ziv codec. The residual signal ($r_{2i}^{E}$) to be encoded by the Wyner-Ziv encoder is the prediction error between the input video frame ($I_{2i}$) and the predictive frame ($\tilde{I}_{2i}^{P(E)}$). The residual signal ($r_{2i}^{E}$) is transformed by the transformer 56 so that related coefficients are obtained. The quantizer 57 performs a quantization operation to the coefficients to obtain a DCT block. The quantized DCT block is decomposed into bit-planes by a turbo encoder 71. For each bit-plane, only the parity check bits are transmitted to a turbo decoder 73. The turbo decoder 73 would request more parity bits if it cannot recover the data correctly. In addition, a buffer 72 can store the parity check bits. The above-mentioned operations are implemented as Slepian-Wolf codec. During reconstructing frames, the side information at the decoder side is obtained by interpolation, bi-directional motion estimation, and the residual signal estimated according to the frames from the scalable video decoder 62.

The predictive image selectors 54, 64 in the encoder 31 and the decoder 32 will exploit temporal correlation between adjacent images to reduce the signal entropy of different images. For one image ($I_{2i}$) to be encoded, it has to find the best predictive one ($\tilde{I}_{2i}^{P(E)}$) that would yield best rate-distortion efficiency. The predictive image ($\tilde{I}_{2i}^{P(E)}$) has less difference to the original one ($I_{2i}$). The predictive image ($\tilde{I}_{2i}^{P(E)}$) is selected from the reconstructed images of the scalable video encoder and decoder 52, 53 in that both the encoder and decoder 52, 53 have to refer to the same image. The best predictive image ($\tilde{I}_{2i}^{P(E)}$) is selected from three reconstructed images $\tilde{I}_{2i-1}^{E}$, $\tilde{I}_{2i+1}^{E}$, and the average of both images. For the predictive image selector 54, the procedure to select the best predictive image ($\tilde{I}_{2i}^{P(E)}$) is described below.

In the beginning, calculate the difference between the original image frame ($I_{2i}$) and the average of both the two reconstructed images, $\tilde{I}_{2i-1}^{E}$, $\tilde{I}_{2i+1}^{E}$, the difference between $I_{2i}$ and $\tilde{I}_{2i-1}^{E}$, and the difference between $I_{2i}$ and $\tilde{I}_{2i+1}^{E}$, represented as $\Delta I_0 = |I_{2i} - P_0(I_{2i})|$, $\Delta I_1 = |I_{2i} - P_1(I_{2i})|$, and $\Delta I_2 = |I_{2i} - P_2(I_{2i})|$, respectively. The predictive modes $P_0$, $P_1$, and $P_2$ are $$\frac{\tilde{I}_{2i-1}^{E} + \tilde{I}_{2i+1}^{E}}{2},$$

$\tilde{I}_{2i-1}^{E}$, and $\tilde{I}_{2i+1}^{E}$, respectively.

When the difference between the original image frame ($I_{2i}$) and $\tilde{I}_{2i-1}^{E}$, and the difference between $I_{2i}$ and $\tilde{I}_{2i+1}^{E}$, are both smaller than or equal to predetermined thresholds, i.e. $\Delta I_1 \leq \epsilon_1$ and $\Delta I_2 \leq \epsilon_2$, select the prediction mode $P_i$ that minimizes the differences, i.e. $\Delta I_i = \min\{\Delta I_1, \Delta I_2\}$.

When the difference between the original image frame ($I_{2i}$) and $\tilde{I}_{2i-1}^{E}$, and the difference between $I_{2i}$ and $\tilde{I}_{2i+1}^{E}$, are both greater than the predetermined thresholds, i.e. $\Delta I_1 > \epsilon_1$ and $\Delta I_2 > \epsilon_2$ and $|\Delta I_1 - \Delta I_2| \leq \epsilon_0$, select the prediction mode $P_0$.

When the difference between the original image frame ($I_{2i}$) and $\tilde{I}_{2i-1}^{E}$, and the difference between $I_{2i}$ and $\tilde{I}_{2i+1}^{E}$, are both greater than the predetermined thresholds, i.e. $\Delta I_1 > \epsilon_1$ and $\Delta I_2 > \epsilon_2$ and $|\Delta I_1 - \Delta I_2| > \epsilon_0$, select the prediction mode $P_i$ that minimizes the differences, i.e. $\Delta I_i = \min\{\Delta I_1, \Delta I_2\}$.

Instead of just selecting the prediction mode $P_i$ that yield $\Delta I_i = \min\{\Delta I_1, \Delta I_2\}$, the above-mentioned selection is carried out from the viewpoint of video temporal correlation. The distortion $\Delta I_i$ is proportional to video complexity at that period. When $\Delta I_1 \leq \epsilon_1$ and $\Delta I_2 \leq \epsilon_2$, the video should be stable during that interval, and the prediction mode $P_1$ or $P_2$ is adopted since the correlation between consequential images is high. When both $\Delta I_1$ and $\Delta I_2$ are greater than the thresholds, and $|\Delta I_1 - \Delta I_2|$ is small, the video should be in a high-motion period and thus the image variation is great. However, the correlations are still equal to each other. When $|\Delta I_1 - \Delta I_2|$ is great, the correlation among these three images is small, and thus the prediction mode $P_1$ or $P_2$ is selected to yield the minimum $\Delta I_i$.

Figure 5:
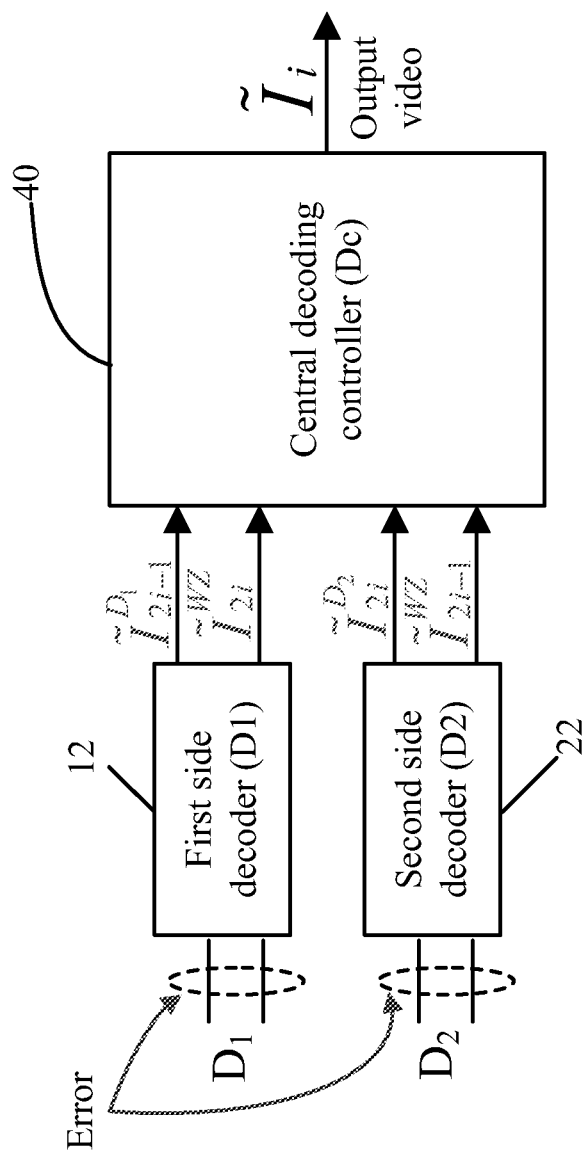
FIG. 5 is an exemplary diagram showing the central decoder controlling method of the present invention.

Referring to FIG. 5, it is an exemplary diagram showing the central decoder controlling method of the present invention. According to the description above, the D1 information in the first channel 10 includes key frame (So) and error correction codes (i.e. the residual signal or the WZ frame ($r_e$)) of the frame adjacent to the key frame (So). The D2 information in the second channel 20 includes next or previous key frame (Se) and error correction codes (i.e. the residual signal or the WZ frame ($r_o$)) of the frame adjacent to the key frame (Se).

Correspondingly, the first side decoder (D1) 12 on the first channel 10 generates the reconstructed frames of odd sequence ($\tilde{I}_{2i-1}^{D}$), and the frames of even sequence ($\tilde{I}_{2i}^{WZ}$) that have been error corrected. The second side decoder (D2) 22 on the second channel 20 generates the reconstructed frames of even sequence ($\tilde{I}_{2i}^{D}$), and the frames of odd sequence ($\tilde{I}_{2i-1}^{WZ}$) that have been error corrected. The central decoding controller (Dc) 40 receives the reconstructed frames of even sequence ($\tilde{I}_{2i}^{D}$) and odd sequence ($\tilde{I}_{2i-1}^{D}$), the even sequence ($\tilde{I}_{2i}^{WZ}$), and the odd sequence ($\tilde{I}_{2i-1}^{WZ}$), and then performs a correlation operation to these frames. The central decoding controller (Dc) 40 will select one of these frames as an output, according to the result of correlation.

When one description (e.g. the D2 information) can not be received correctly, the first side decoder (D1) 12 is still able to provide the reconstructed frames of odd sequence ($\tilde{I}_{2i-1}^{D}$) and the frames of even sequence ($\tilde{I}_{2i}^{WZ}$) to be outputted. Under this situation, the PSNR would be fluctuated and unpleasant visual quality would be presented. At different time duration, the D1 information and/or the D2 information may subject to transmission errors. These descriptions will be attacked by noise signals, and the noise will prevent the central decoding controller (Dc) 40 from reconstructing video with high quality. However, in the present invention, the central decoding controller (Dc) 40 can dynamically select an image $I_i$, either from $\tilde{I}_i^{WZ}$ or $\tilde{I}_i^{D}$ image, with high reconstructed quality, as the output video. Therefore, the present invention can improve the quality of video transmitted under wireless networks or jammed, unstable internet transmission.

Figure 6:
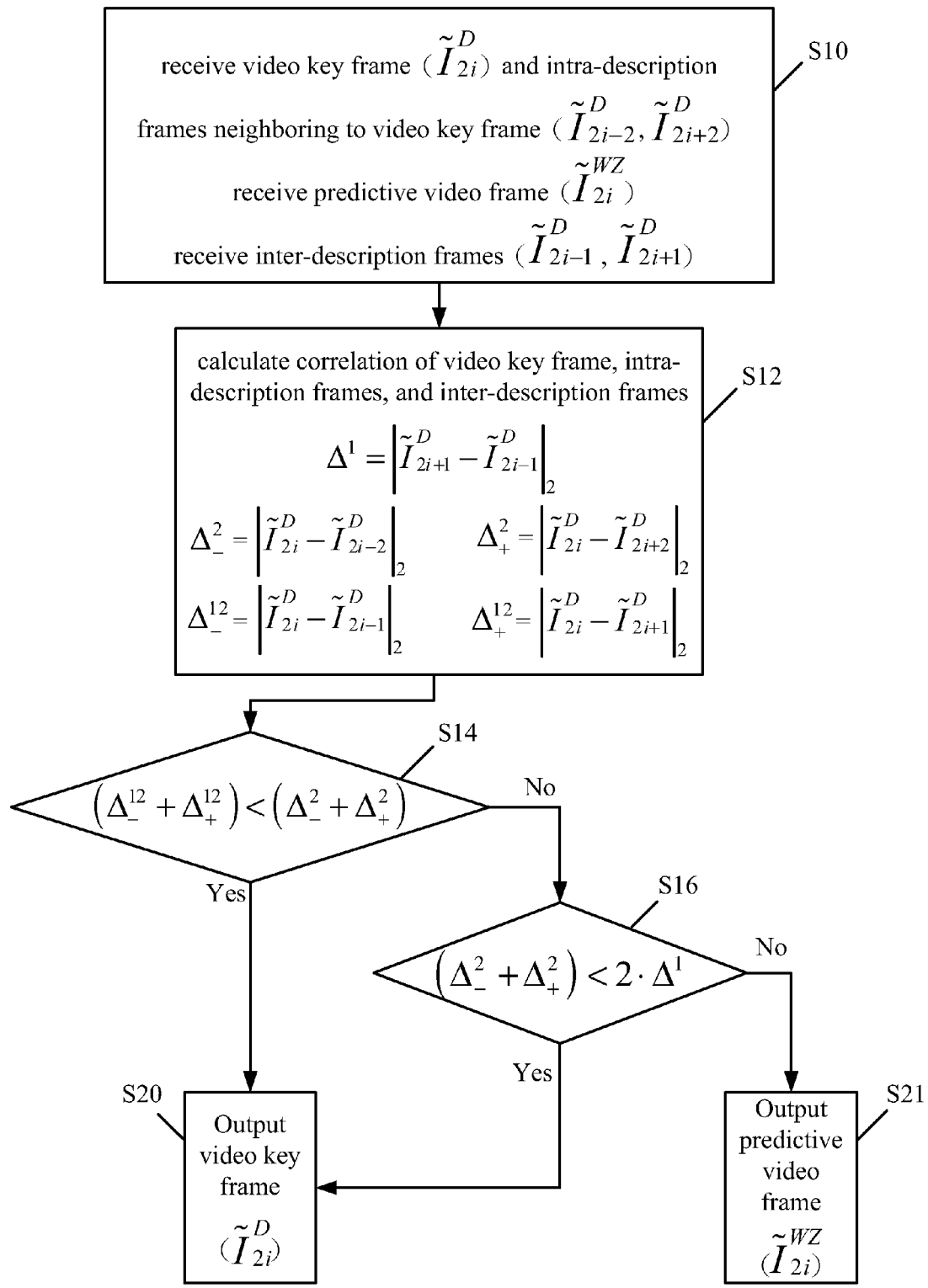
FIG. 6 is a flow chart showing the central decoder controlling method of the present invention.
Figure 7:
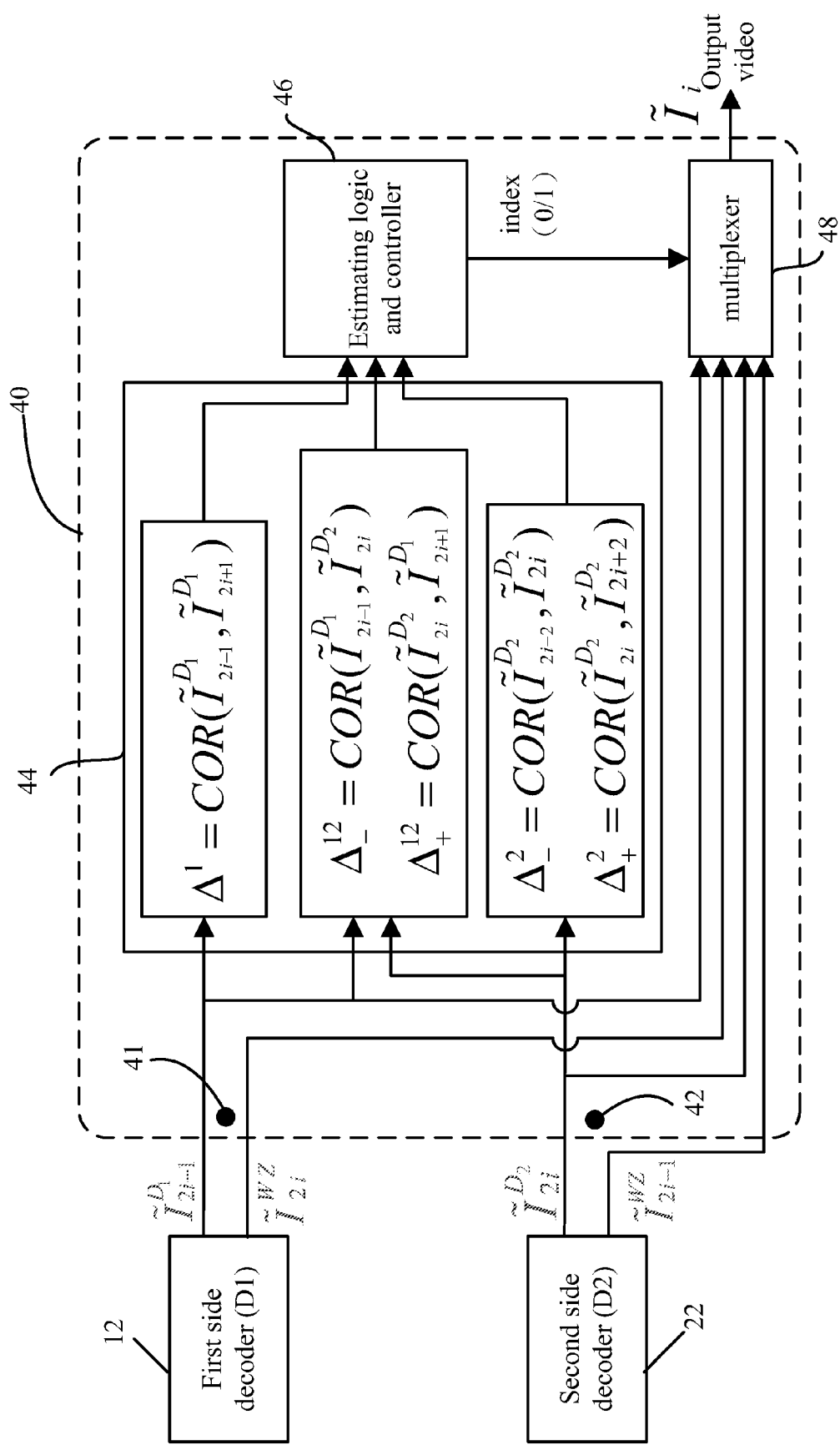
FIG. 7 is a structural diagram showing the central decoding controller of the present invention.
Figure 8:
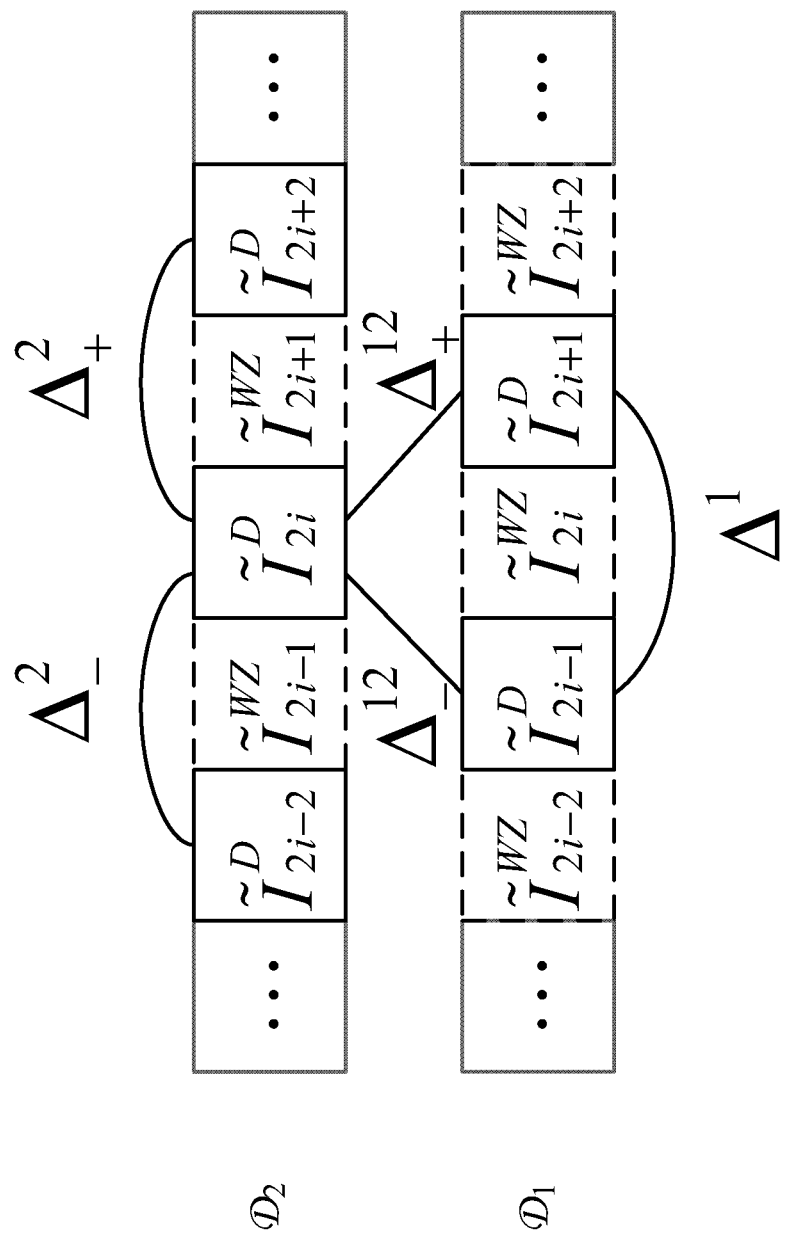
FIG. 8 is an exemplary diagram showing correlation operation of the central decoder controlling method of the present invention.

Please refer to FIG. 6, FIG. 7, and FIG. 8. FIG. 6 is a flow chart showing the central decoder controlling method of the present invention. FIG. 7 is a structural diagram showing the central decoding controller 40 of the present invention. FIG. 8 is an exemplary diagram showing the correlation operation of the central decoder controlling method of the present invention. As shown in FIG. 7, the central decoding controller 40 of the present invention has a first terminal 41 and a second terminal 42. The two terminals 41, 42 receive video frames respectively from the first channel 10 and the second channel 20. The central decoding controller 40 comprises a correlator 44, an estimating logic and controller 46, and a multiplexer 48. The correlator 44 is coupled to the first terminal 41 and the second terminal 42. The correlator 44 performs correlation operations to the video frames from the two terminals 41, 42. The estimating logic and controller 46 is coupled to the correlator 44, and is utilized for controlling the correlator 44 and outputting a signal according to the result of correlation. The multiplexer 48 is controlled by the estimating logic and controller 46, and is utilized for selecting the video frames of best quality as output frames. The video frames ($\tilde{I}_{2i-1}^{D}$, $\tilde{I}_{2i}^{WZ}$) from the first channel 10 and the video frames ($\tilde{I}_{2i}^{D}$, $\tilde{I}_{2i-1}^{WZ}$) from the second channel 20 are received by the multiplexer 48.

Referring to the flow chart shown in FIG. 6, the central decoder controlling of the present invention will be described in conjunction with the central decoding controller 40 shown in FIG. 7 and the correlation operation shown in FIG. 8.

In step S10, the second terminal 42 of the central decoding controller 40 receives a video key frame reconstructed from the second side decoder (D2) 22 and a plurality of intra-description frames ($\tilde{I}_{2i-2}^{D}$, $\tilde{I}_{2i+2}^{D}$) neighboring the video key frame, via the second channel 20. The video key frame ($\tilde{I}_{2i}^{D}$) is resulted by decoding and reconstructing an original video frame ($I_{2i}$) via the second channel 20.

In addition, the first terminal 41 of the central decoding controller 40 receives a predictive video frame ($\tilde{I}_{2i}^{WZ}$), which is obtained by processing a prediction analysis and an error correction to the original video frame ($I_{2i}$), via the first channel 10 parallel to the second channel 20. The predictive video frame ($\tilde{I}_{2i}{}^{WZ}$) is an image obtained by predicting the video key frame ($\tilde{I}_{2i}{}^{D}$).

The first terminal 41 of the central decoding controller 40 receives a plurality of inter-description frames ($\tilde{I}_{2i-1}{}^{D}, \tilde{I}_{2i+1}{}^{D}$) via the first terminal 10. The inter-description frames are odd frames neighboring the video key frame ($I_{2i}{}^{D}$). The inter-description frames ($\tilde{I}_{2i-1}{}^{D}, \tilde{I}_{2i+1}{}^{D}$) is resulted by decoding and reconstructing odd video frames ($I_{2i-1}, I_{2i+1}$) via the first channel 10.

In step S12, the correlator 44 of the central decoding controller 40 receives the video key frame ($\tilde{I}_{2i}{}^{D}$), the intra-description frames ($\tilde{I}_{2i-2}{}^{D}, \tilde{I}_{2i+2}{}^{D}$), and the inter-description frames ($\tilde{I}_{2i-1}{}^{D}, \tilde{I}_{2i+1}{}^{D}$), and performs correlation operations to these frames. For example, calculate the inter-description frame ($\tilde{I}_{2i-1}{}^{D}, \tilde{I}_{2i+1}{}^{D}$) difference, $\Delta^1 = |\tilde{I}_{2i+1}{}^{D} - \tilde{I}_{2i-1}{}^{D}|_2$; the difference between the video key frame ($\tilde{I}_{2i}{}^{D}$) and the intra-description frames ($\tilde{I}_{2i-2}{}^{D}, \tilde{I}_{2i+2}{}^{D}$), $\Delta_{-}{}^2 = |\tilde{I}_{2i}{}^{D} - \tilde{I}_{2i-2}{}^{D}|_2$, $\Delta_{+}{}^2 = |\tilde{I}_{2i}{}^{D} - \tilde{I}_{2i+2}{}^{D}|_2$; and the difference between the video key frame ($\tilde{I}_{2i}{}^{D}$) and the inter-description frames ($\tilde{I}_{2i-1}{}^{D}, \tilde{I}_{2i+1}{}^{D}$), $\Delta_{-}{}^{12} = |\tilde{I}_{2i}{}^{D} - \tilde{I}_{2i-1}{}^{D}|_2$, $\Delta_{+}{}^{12} = |\tilde{I}_{2i}{}^{D} - \tilde{I}_{2i+1}{}^{D}|_2$.

In step S14 and step S16 the estimating logic and controller 46 receives the result of the above-mentioned correlation from the correlator 44, and determines or controls according to the result of correlation.

In step S14, the estimating logic and controller 46 determines whether the correlation of the video key frame ($\tilde{I}_{2i}{}^{D}$) and the inter-description frames ($\tilde{I}_{2i-1}{}^{D}, \tilde{I}_{2i+1}{}^{D}$) is greater than the correlation of the video key frame ($\tilde{I}_{2i}{}^{D}$) and the intra-description frames ($\tilde{I}_{2i-2}{}^{D}, \tilde{I}_{2i+2}{}^{D}$), for example, whether the sum of the differences between the video key frame and the inter-description frames is smaller than the sum of the differences between the video key frame and the intra-description frames, i.e. $(\Delta_{-}{}^{12} + \Delta_{+}{}^{12}) < (\Delta_{-}{}^2 + \Delta_{+}{}^2)$. If yes, the estimating logic and controller 46 controls the multiplexer 48 to select the video key frame ($\tilde{I}_{2i}{}^{D}$) as output frame (step S20).

In step S16, when the result determined in step S14 is negative, the estimating logic and controller 46 will determine whether the correlation of the video key frame ($\tilde{I}_{2i}{}^{D}$) and the intra-description frames ($\tilde{I}_{2i-2}{}^{D}, \tilde{I}_{2i+2}{}^{D}$) is greater than two times the correlation of the inter-description frames ($\tilde{I}_{2i-1}{}^{D}, \tilde{I}_{2i+1}{}^{D}$), for example, whether the sum of the differences between the video key frame and the intra-description frames is smaller than two times the difference between the inter-description frames, i.e. $(\Delta_{-}{}^2 + \Delta_{+}{}^2) < 2\cdot\Delta^1$. If yes, the estimating logic and controller 46 controls the multiplexer 48 to select the video key frame ($\tilde{I}_{2i}{}^{D}$) as output frame (step S20). If no, the estimating logic and controller 46 controls the multiplexer 48 to select the predictive video frame ($\tilde{I}_{2i}{}^{WZ}$) as output frame (step S21). This embodiment takes the even frames ($\tilde{I}_{2i}{}^{D}$) as the video key frame. If the video key frame is odd one ($\tilde{I}_{2i-1}{}^{D}$), the operation is similar or the same. The description is omitted herein.

In addition, according to the above-mentioned determination, the estimating logic and controller 46 outputs an index (0 or 1) as a control signal for controlling the multiplexer 48. For example, when the estimating logic and controller 46 outputs the index 1, the multiplexer 48 selects the video key frame ($\tilde{I}_{2i}{}^{D}$) as output frame. When the estimating logic and controller 46 outputs the index 0, the multiplexer 48 selects the predictive video frame ($\tilde{I}_{2i}{}^{WZ}$) as output frame.

The strategy to select the video key frame ($\tilde{I}_{2i}{}^{D}$) or the predictive video frame ($\tilde{I}_{2i}{}^{WZ}$) is described below. (1) The result determined in step S14 is positive. That is, the sum of the differences between the video key frame and the inter-description frames is smaller than the sum of the differences between the video key frame and the intra-description frames, i.e. $(\Delta_{-}{}^{12} + \Delta_{+}{}^{12}) < (\Delta_{-}{}^2 + \Delta_{+}{}^2)$. It can be referred that the video key frame ($\tilde{I}_{2i}{}^{D}$) is not degraded by noise attack and its quality should be better than the predictive video frame ($\tilde{I}_{2i}{}^{WZ}$). Hence, the estimating logic and controller 40 selects the video key frame ($\tilde{I}_{2i}{}^{D}$) as output frame. (2) The result determined in step S14 is negative. That is, the sum of the differences between the video key frame and the inter-description frames is much greater. It is noted that there are degraded images among these three key frames, i.e. $\tilde{I}_{2i}{}^{D}, \tilde{I}_{2i-1}{}^{D}$, and $\tilde{I}_{2i+1}{}^{D}$. The condition $(\Delta_{-}{}^2 + \Delta_{+}{}^2) < 2\cdot\Delta^1$ is then used to make clear which one is degraded. When this condition is satisfied, the degraded image should be $\tilde{I}_{2i-1}{}^{D}$ or $\tilde{I}_{2i+1}{}^{D}$, and the predictive video frame ($\tilde{I}_{2i}{}^{WZ}$) would be affected by this degradation. Hence, the estimating logic and controller 40 selects the video key frame ($\tilde{I}_{2i}{}^{D}$) as output frame. (3) When both the above-mentioned first and second conditions failed, it can be referred that the video key frame ($\tilde{I}_{2i}{}^{D}$) is degraded. Hence, the estimating logic and controller 40 selects the predictive video frame ($\tilde{I}_{2i}{}^{WZ}$) as output frame.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A central decoder controlling method, in which a video stream is processed and transmitted via at least two parallel channels, the method comprises steps of:
   receiving a video key frame obtained by decoding an original video frame via a first channel, and a plurality of intra-description frames neighboring the video key frame;
   receiving a predictive video frame obtained by processing a prediction analysis and an error correction to the original video frame via a second channel parallel to the first channel;
   receiving a plurality of inter-description frames via the second channel, the inter-description frames neighboring the video key frame;
   calculating correlation between the neighboring inter-description frames, correlation between the video key frame and the neighboring inter-description frames, and correlation between the video key frame and the neighboring intra-description frames; and
   selecting the video key frame or the predictive video frame as an output frame according to the correlation results;
   wherein the video key frame is selected as the output frame if a condition $(\Delta_{-}{}^{12} + \Delta_{+}{}^{12}) < (\Delta_{-}{}^2 + \Delta_{+}{}^2)$ is satisfied, where $(\Delta_{-}{}^{12} + \Delta_{-}{}^{12})$ is the sum of the differences between the video key frame and the neighboring inter-description frames, and $(\Delta_{-}{}^2 + \Delta_{+}{}^2)$ is the sum of the differences between the video key frame and the neighboring intra-description frames.

2. The central decoder controlling method of claim 1, wherein in the selecting step, when the correlation of the video key frame and the inter-description frames is greater than the correlation of the video key frame and the intra-description frames, select the video key frame as the output frame.

3. The central decoder controlling method of claim 1, wherein in the selecting step, when the correlation of the video key frame and the neighboring inter-description frames is smaller than the correlation of the video key frame and the neighboring intra-description frames, and the correlation of the video key frame and the neighboring intra-description frames is greater than two times the correlation of the neighboring inter-description frames, select the video key frame as the output frame.

4. The central decoder controlling method of claim 3, wherein the video key frame is selected as the output frame if conditions $(\Delta_-^{1^2}+\Delta_+^{1^2})>(\Delta_-^2+\Delta_+^2)$ and $(\Delta_-^2+\Delta_+^2)<2\cdot\Delta^1$ are satisfied, where $(\Delta_-^{1^2}+\Delta_+^{1^2})$ is the sum of the differences between the video key frame and the neighboring inter-description frames, $(\Delta_-^2+\Delta_+^2)$ is the sum of the differences between the video key frame and the neighboring intra-description frames, and $\Delta^1$ is the difference between the neighboring inter-description frames.

5. The central decoder controlling method of claim 1, wherein in the selecting step, when the correlation of the video key frame and the neighboring inter-description frames is smaller than the correlation of the video key frame and the neighboring intra-description frames, and the correlation of the video key frame and the neighboring intra-description frames is smaller than two times the correlation of the neighboring inter-description frames, select the predictive video frame as the output frame.

6. The central decoder controlling method of claim 5, wherein the predictive video frame is selected as the output frame if conditions $(\Delta_-^{1^2}+\Delta_+^{1^2})>(\Delta_-^2+\Delta_+^2)$ and $(\Delta_-^2+\Delta_+^2)>2\cdot\Delta^1$ are satisfied, where $(\Delta_-^{1^2}+\Delta_+^{1^2})$ is the sum of the differences between the video key frame and the neighboring inter-description frames, $(\Delta_-^2+\Delta_+^2)$ is the sum of the differences between the video key frame and the neighboring intra-description frames, and $\Delta^1$ is the difference between the neighboring inter-description frames.

7. The central decoder controlling method of claim 1, wherein the correlation between the neighboring inter-description frames is to calculate the image difference between the neighboring inter-description frames, the correlation between the video key frame and the neighboring inter-description frames is to calculate the image difference between the video key frame and the neighboring inter-description frames, and the correlation between the video key frame and the neighboring intra-description frames is to calculate the image difference between the video key frame and the neighboring intra-description frames.

8. The central decoder controlling method of claim 1, wherein the predictive video frame is obtained by utilizing Wyner-Ziv codec.

9. A central decoding controller, in which a video stream is processed and transmitted via at least two parallel channels, the central decoding controller comprises:
a first terminal for receiving a video key frame obtained by decoding an original video frame via a first channel, and a plurality of intra-description frames neighboring the video key frame;
a second terminal for receiving a predictive video frame obtained by processing a prediction analysis and an error correction to the original video frame via a second channel parallel to the first channel, and a plurality of inter-description frames via the second channel, the inter-description frames neighboring the video key frame;
a correlator, coupled to the first terminal and the second terminal, for calculating correlation between the n inter-description frames, correlation between the video key frame and the neighboring inter-description frames, and correlation between the video key frame and the neighboring intra-description frames;
an estimating logic and controller, coupled to the correlator, for controlling the correlator and outputting a signal according to the correlation results; and
a multiplexer, for receiving the video key frame from the first terminal and the predictive video frame from the second terminal, the multiplexer coupled to the estimating logic and controller, in which the estimating logic and controller controls the multiplexer to select the video key frame or the predictive video frame as an output frame
wherein when the estimating logic and controller determines that a condition $(\Delta_-^{1^2}+\Delta_+^{1^2})<(\Delta_-^2+\Delta_+^2)$ is satisfied, where $(\Delta_-^{1^2}+\Delta_+^{1^2})$ is the sum of the differences between the video key frame and the neighboring inter-description frames, and $(\Delta_-^2+\Delta_+^2)$ is the sum of the differences between the video key frame and the neighboring intra-description frames, the estimating logic and controller controls the multiplexer to select the video key frame as the output frame.

10. The central decoding controller of claim 9, wherein when the estimating logic and controller determines that the correlation of the video key frame and the neighboring inter-description frames is greater than the correlation of the video key frame and the neighboring intra-description frames, the estimating logic and controller controls the multiplexer to select the video key frame as the output frame.

11. The central decoding controller of claim 9, wherein when the estimating logic and controller determines that the correlation of the video key frame and the neighboring inter-description frames is smaller than the correlation of the video key frame and the neighboring intra-description frames, and the correlation of the video key frame and the neighboring intra-description frames is greater than two times the correlation of the neighboring inter-description frames, the estimating logic and controller controls the multiplexer to select the video key frame as the output frame.

12. The central decoding controller of claim 11, wherein when the estimating logic and controller determines that a conditions $(\Delta_-^{1^2}+\Delta_+^{1^2})>(\Delta_-^2+\Delta_+^2)$ and $(\Delta_-^2+\Delta_+^2)<2\cdot\Delta^1$ is are satisfied, where $(\Delta_-^{1^2}+\Delta_+^{1^2})$ is the sum of the differences between the video key frame and the neighboring inter-description frames, $(\Delta_-^2+\Delta_+^2)$ is the sum of the differences between the video key frame and the neighboring intra-description frames, and $\Delta^1$ is the difference between the neighboring inter-description frames, the estimating logic and controller controls the multiplexer to select the video key frame as the output frame.

13. The central decoding controller of claim 9, wherein when the estimating logic and controller determines that the correlation of the video key frame and the neighboring inter-description frames is smaller than the correlation of the video key frame and the neighboring intra-description frames, and the correlation of the video key frame and the neighboring intra-description frames is smaller than two times the correlation of the neighboring inter-description frames, the estimating logic and controller controls the multiplexer to select the predictive video frame as the output frame.

14. The central decoding controller of claim 13, wherein when the estimating logic and controller determines that conditions $(\Delta_-^{1^2}+\Delta_+^{1^2})>(\Delta_-^2+\Delta_+^2)$ and $(\Delta_-^2+\Delta_+^2)>\Delta^1$ are satisfied, where $(\Delta_-^{1^2}+\Delta_+^{1^2})$ is the sum of the differences between the video key frame and the neighboring inter-description frames, $(\Delta_-^2+\Delta_+^2)$ is the sum of the differences between the video key frame and the neighboring intra-description frames, and $\Delta^1$ is the difference between the neighboring inter-description frames, the estimating logic and controller controls the multiplexer to select the predictive video frame as the output frame.

15. The central decoding controller of claim 9, wherein the correlation between the neighboring inter-description frames is to calculate the image difference between the neighboring inter-description frames, the correlation between the video key frame and the neighboring inter-description frames is to calculate the image difference between the video key frame and the neighboring inter-description frames, and the correlation between the video key frame and the neighboring intra-description frames is to calculate the image difference between the video key frame and the neighboring intra-description frames.

16. The central decoding controller of claim 9, wherein the predictive video frame is obtained by utilizing Wyner-Ziv codec.

* * * * *